(12) United States Patent
Wang et al.

(10) Patent No.: US 11,488,402 B2
(45) Date of Patent: Nov. 1, 2022

(54) METHOD AND SYSTEM FOR SEGMENTING TOUCHING TEXT LINES IN IMAGE OF UCHEN-SCRIPT TIBETAN HISTORICAL DOCUMENT

(71) Applicant: Northwest Minzu University, Lanzhou (CN)

(72) Inventors: Weilan Wang, Lanzhou (CN); Pengfei Hu, Lanzhou (CN); Xiaojuan Wang, Lanzhou (CN); Tiejun Wang, Lanzhou (CN); Yusheng Hao, Lanzhou (CN)

(73) Assignee: Northwest Minzu University, Lanzhou (CN)

( * ) Notice: Subject to any disclaimer, the term of this patent is extended or adjusted under 35 U.S.C. 154(b) by 0 days.

(21) Appl. No.: 17/167,684

(22) Filed: Feb. 4, 2021

(65) Prior Publication Data

US 2021/0365708 A1 Nov. 25, 2021

(30) Foreign Application Priority Data

May 25, 2020 (CN) .......................... 202010447300.X

(51) Int. Cl.
*G06V 30/148* (2022.01)
*G06T 7/187* (2017.01)
(Continued)

(52) U.S. Cl.
CPC .............. *G06V 30/153* (2022.01); *G06T 7/12* (2017.01); *G06T 7/13* (2017.01); *G06T 7/187* (2017.01);
(Continued)

(58) Field of Classification Search
CPC .... G06K 9/344; G06K 9/00449; G06K 9/342; G06K 9/348; G06K 9/38; G06T 7/12; G06T 7/13; G06T 7/187
See application file for complete search history.

(56) References Cited

U.S. PATENT DOCUMENTS

2014/0079316 A1* 3/2014 Vitaladevuni .......... G06K 9/469
382/159

FOREIGN PATENT DOCUMENTS

| CN | 107067005 A | | 8/2017 | |
| CN | 107944451 A | * | 4/2018 | ............. G06K 9/342 |
| CN | 107944451 A | | 4/2018 | |

OTHER PUBLICATIONS

Likforman-Sulem, L., Zahour, A. and Taconet, B., 2007. Text line segmentation of historical documents: a survey. International Journal of Document Analysis and Recognition (IJDAR), 9(2), pp. 123-138.*

* cited by examiner

*Primary Examiner* — Zhitong Chen
(74) *Attorney, Agent, or Firm* — Bulkley, Richardson and Gelinas, LLP; Mary R. Bonzagni, Esq.

(57) ABSTRACT

A method and system for segmenting touching text lines in an image of a uchen-script Tibetan historical document are provided. The method includes: first obtaining a binary image of a uchen-script Tibetan historical document after layout analysis; detecting local baselines in the binary image, to generate a local baseline information set; detecting and segmenting a touching region in the binary image according to the local baseline information set, to generate a touching-region-segmented image; allocating connected components in the touching-region-segmented image to corresponding lines, to generate a text line allocation result; and splitting text lines in the touching-region-segmented image according to the text line allocation result, to generate a line-segmented image. In the present disclosure, touching text lines in a Tibetan historical document can be effectively segmented, and text line segmentation efficiency of the Tibetan historical document is improved.

8 Claims, 12 Drawing Sheets

(51) Int. Cl.
*G06T 7/12* (2017.01)
*G06T 7/13* (2017.01)
*G06V 10/26* (2022.01)
*G06V 30/412* (2022.01)

(52) U.S. Cl.
CPC .......... *G06V 10/267* (2022.01); *G06V 30/158* (2022.01); *G06V 30/412* (2022.01)

Template image 1   Template image 2   Template image 3   Template image 4

METHOD AND SYSTEM FOR SEGMENTING TOUCHING TEXT LINES IN IMAGE OF UCHEN-SCRIPT TIBETAN HISTORICAL DOCUMENT

CROSS-REFERENCE TO RELATED APPLICATION

This application claims the benefit of priority of Chinese Patent Application No. 202010447300.X, filed May 25, 2020, the contents of which is herein incorporated by reference.

TECHNICAL FIELD

The present disclosure relates to the technical field of automatic processing of images of Tibetan historical documents, and in particular, to a method and system for segmenting touching text lines in an image of an uchen-script Tibetan historical document.

BACKGROUND

There are tremendous Tibetan documents, the quantity being second only to Chinese documents. Besides, Tibetan documents are in various forms, including woodblock edition, thread-bound edition, hand-written edition, stereotype edition, mural characters, and the like. For a woodblock uchen-script Tibetan historical document, uchen-script Tibetan characters are printed on paper after wood carving. Such historical documents are precious cultural heritage with high research value, and need to be analyzed and protected from perspectives of different fields of science by using science and technology. Among many methods at present, to recognize historical document images by using a computer is a good option for digital protection. However, due to handwriting fall-off, broken paper, complex noise and other conditions of Tibetan historical documents, there are many difficulties in layout analysis, line segmentation, character segmentation, recognition, and other content researches for images of uchen-script Tibetan historical documents.

After layout analysis and preprocessing for a document image, it is a key step to further obtain text lines, that is, segmenting text lines. A woodblock Tibetan ancient book in uchen script is obtained through manual splitting and then printing on Tibetan paper with a special printing ink. The whole process involves many manual factors. For example, uchen-script Tibetan documents are different from printed Tibetan documents in which all characters and syllable dots in the same line are absolutely aligned to a baseline of the characters and are on the same horizontal line. In addition, as Tibetan characters have different heights and the distance between text lines is small in a woodblock uchen-script Tibetan historical document, line segmentation cannot be implemented by the methods based on projections or bounding rectangles. Touching character strokes may even occur between adjacent text lines, making text line segmentation more complex. Moreover, due to a long history and poor storage conditions of Tibetan historical documents, the paper of the documents was damaged, and a large amount of noise, broken strokes, and complex adhesion caused by stains appeared in generated image documents. Therefore, it is a great challenge to segment text lines in an image of a uchen-script Tibetan historical document.

In the prior art, the patent entitled "line segmentation method and system for Tibetan historical document" (Patent No.: 201711206538.8) discloses a line segmentation method based on contour tracking. In the method, barycenters of connected components are calculated, and connected components meeting a specific relationship are connected according to a distance between barycenters; finally, a whole text line is extracted through contour tracking. The method fails to segment touching text lines, and has high time complexity. During processing of adhesion, there are mainly the following two methods: The first method is to project a touching region to find a smallest projection point for segmentation. This method can achieve a good effect for a document in a normal print form, but cannot achieve a good effect for a Tibetan historical document with poor image quality and complex adhesion. The second method is to use a neural network. In patent No. CN201710226748, a segmentation problem is considered as a binary classification problem of segmentation points and non-segmentation points. However, this method requires a large quantity of labeled samples, resulting in high costs and low segmentation efficiency. Therefore, both the existing line segmentation algorithms for Tibetan historical documents fail to effectively segment touching text lines.

SUMMARY

An objective of the present disclosure is to provide a method and a system for segmenting touching text lines in an image of a uchen-script Tibetan historical document, to solve the problems that the existing line segmentation algorithms for Tibetan historical documents fail to effectively segment touching text lines and have low segmentation efficiency.

To achieve the above objectives, the disclosure provides the following technical solutions.

A method for segmenting touching text lines in an image of a uchen-script Tibetan historical document, includes:
  obtaining a binary image of a uchen-script Tibetan historical document after layout analysis;
  detecting local baselines in the binary image, to generate a local baseline information set;
  detecting and segmenting a touching region in the binary image according to the local baseline information set, to generate a touching-region-segmented image;
  allocating connected components in the touching-region-segmented image to corresponding lines, to generate a text line allocation result;
  splitting text lines in the touching-region-segmented image according to the text line allocation result, to generate a line-segmented image.

Optionally, the detecting local baselines in the binary image to generate a local baseline information set includes:
  projecting the binary image horizontally, and counting a total quantity of foreground color pixels in each Y-axis position in X-axis direction, to generate a horizontal projection set;
  searching for line segments in the binary image by using a Hough line detection method, to generate a line segment length set in each Y-axis position in X-axis direction;
  determining, according to the horizontal projection set, a median of the horizontal projection set, the line segment length set, and a median of the line segment length set, baseline positions that possibly have baseline information, to generate a first baseline information set;

detecting connected components in the binary image, to generate a connected component set in each Y-axis position in X-axis direction;

counting the quantity of upper edges of connected-component minimum bounding rectangles in each Y-axis position in X-axis direction according to the connected component set, to generate a bounding rectangle quantity set;

calculating an average character height according to the connected component set;

filtering the baseline positions in the first baseline information set according to the bounding rectangle quantity set and the average height of character, to generate a second baseline information set;

grouping the baseline positions in the second baseline information set according to the average character height, to determine text line position information;

determining each local baseline according to the text line position information, to generate the local baseline information set.

Optionally, the detecting and segmenting a touching region in the binary image according to the local baseline information set to generate a touching-region-segmented image specifically, includes:

determining a touching region according to the connected component set and the local baseline information set;

performing medial axis transformation on the touching region, to generate a transformed touching region;

determining a touching point in the transformed touching region according to the local baseline information set and the average character height;

detecting unsmooth points in the touching region by using a Douglas-Peucker algorithm to obtain X-axis coordinates and Y-axis coordinates of the unsmooth points, and sequentially storing the X-axis coordinates and Y-axis coordinates into a candidate splitting list;

looking for optimal segmentation points from the candidate splitting list according to the touching point;

connecting the optimal segmentation points to generate a splitting line; and segmenting the touching region by using the splitting line, to generate the touching-region-segmented image.

Optionally, the allocating connected components in the touching-region-segmented image to corresponding lines to generate a text line allocation result specifically includes:

traversing all the connected components in the connected component set, and directly allocating a connected component passing through a local baseline to a text line where the local baseline is located;

allocating, according to position relationships between the connected components and the first local baseline in the local baseline information set, a connected component of the first text line;

allocating, according to position relationships between the connected components and the last local baseline in the local baseline information set, a connected component of the last text line; and allocating, according to distances from barycenter coordinates of the connected component to adjacent local baselines thereof, the connected component to an adjacent text line, to generate the text line allocation result.

Optionally, the splitting text lines in the touching-region-segmented image according to the text line allocation result to generate a line-segmented image specifically includes:

generating a text line image mask according to the text line allocation result;

performing an AND operation on connected components in each text line of the text line allocation result and the text line image mask, to generate a text line splitting result; and outputting the text line splitting result in the form of an image, to generate the line-segmented image.

A system for segmenting touching text lines in an image of a uchen-script Tibetan historical document includes:

a binary image obtaining module, configured to obtain a binary image of a uchen-script Tibetan historical document after layout analysis;

a local baseline detection module, configured to detect local baselines in the binary image, to generate a local baseline information set;

a touching-region detection and segmentation module, configured to detect and segment a touching region in the binary image according to the local baseline information set, to generate a touching-region-segmented image;

a module for allocation of connected components to corresponding lines, configured to allocate connected components in the touching-region-segmented image to corresponding lines, to generate a text line allocation result; and a text line splitting module, configured to split text lines in the touching-region-segmented image according to the text line allocation result, to generate a line-segmented image.

Optionally, the local baseline detection module specifically includes:

a horizontal projection unit, configured to project the binary image horizontally, and count a total quantity of foreground color pixels in each Y-axis position in X-axis direction, to generate a horizontal projection set;

a Hough line detection unit, configured to search for line segments in the binary image by using a Hough line detection method, to generate a line segment length set in each Y-axis position in X-axis direction;

a first-baseline-information-set determining unit, configured to determine, according to the horizontal projection set, a median of the horizontal projection set, the line segment length set, and a median of the line segment length set, baseline positions that possibly have baseline information, to generate a first baseline information set;

a connected component detection unit, configured to detect connected components in the binary image, to generate a connected component set in each Y-axis position in X-axis direction;

a bounding-rectangle-quantity counting unit, configured to count the quantity of upper edges of connected-component minimum bounding rectangles in each Y-axis position in X-axis direction according to the connected component set, to generate a bounding rectangle quantity set;

an average-character-height calculating unit, configured to calculate an average height of characters according to the connected component set;

a baseline position filtering unit, configured to filter the baseline positions in the first baseline information set according to the bounding rectangle quantity set and the average character height, to generate a second baseline information set;

a baseline position grouping unit, configured to group the baseline positions in the second baseline information set according to the average character height, to determine text line position information; and a local baseline determining unit, configured to determine each local baseline according to the text line position information, to generate the local baseline information set.

Optionally, the touching-region detection and segmentation module specifically includes:
a touching region determining unit, configured to determine a touching region according to the connected component set and the local baseline information set;
a medial axis transformation unit, configured to perform medial axis transformation on the touching region, to generate a transformed touching region;
a touching point determining unit, configured to determine a touching point in the transformation touching region according to the local baseline information set and the average height of characters;
an unsmooth point detection unit, configured to detect unsmooth points in the touching region by using a Douglas-Peucker algorithm to obtain X-axis coordinates and Y-axis coordinates of the unsmooth points, and sequentially store the X-axis coordinates and Y-axis coordinates into a candidate splitting list;
an optimal-segmentation-point determining unit, configured to look for optimal segmentation points from the candidate splitting list according to the touching point;
a splitting line generating unit, configured to connect the optimal segmentation points to generate a splitting line; and
a touching region segmenting unit, configured to segment the touching region by using the splitting line, to generate the touching-region-segmented image.

Optionally, the module for allocation of connected components to corresponding lines specifically includes:
a first unit for allocation of connected components to corresponding lines, configured to traverse all the connected components in the connected component set, and directly allocate a connected component passing through a local baseline to a text line where the local baseline is located;
a second unit for allocation of connected components to corresponding lines, configured to allocate, according to position relationships between the connected components and the first local baseline in the local baseline information set, a connected component of the first text line;
a third unit for allocation of connected components to corresponding lines, configured to allocate, according to position relationships between the connected components and the last local baseline in the local baseline information set, a connected component of the last text line; and
a fourth unit for allocation of connected components to corresponding lines, configured to allocate, according to distances from barycenter coordinates of the connected component to adjacent local baselines thereof, the connected component to an adjacent text line, to generate the text line allocation result.

Optionally, the text line splitting module specifically includes:
a text-line-image-mask generating unit, configured to generate a text line image mask according to the text line allocation result;
an AND operation unit, configured to perform an AND operation on connected components in each text line of the text line allocation result and the text line image mask, to generate a text line splitting result; and
a text-line-segmentation-result output unit, configured to output the text line splitting result in the form of an image, to generate the line-segmented image.

According to specific embodiments of the present disclosure, the present disclosure discloses the following technical effects:

The present disclosure provides a method and system for segmenting touching text lines in an image of a uchen-script Tibetan historical document. The method includes: first obtaining a binary image of a uchen-script Tibetan historical document after layout analysis; detecting local baselines in the binary image, to generate a local baseline information set; detecting and segmenting a touching region in the binary image according to the local baseline information set, to generate a touching-region-segmented image; allocating connected components in the touching-region-segmented image to corresponding lines, to generate a text line allocation result; and splitting text lines in the touching-region-segmented image according to the text line allocation result, to generate a line-segmented image. In the present disclosure, local baselines are first detected in an image of a Tibetan historical document after layout analysis; then, a touching region between adjacent lines is detected and segmented; next, according to a result of allocation of connected components to corresponding lines, segmentation is completed and a text line image after the segmentation is generated. Touching text lines in the Tibetan historical document can be effectively segmented, and text line segmentation efficiency of the Tibetan historical document is improved.

BRIEF DESCRIPTION OF THE DRAWINGS

In order to illustrate the embodiments of the present disclosure or the technical solutions of the prior art, the accompanying drawing to be used will be described briefly below. Notably, the following accompanying drawings merely illustrate some embodiments of the present disclosure, and other accompanying drawings can also be obtained by those of ordinary skill in the art based on the accompanying drawings without any creative efforts.

DETAILED DESCRIPTION

The following clearly and completely describes the technical solutions in the embodiments of the present disclosure with reference to accompanying drawings in the embodiments of the present disclosure. Apparently, the described embodiments are merely a part rather than all of the embodiments of the present disclosure.

All other embodiments obtained by a person of ordinary skill in the art based on the embodiments of the present disclosure without creative efforts shall fall within the protection scope of the present disclosure.

An objective of the present disclosure is to provide a method and a system for segmenting touching text lines in an image of an uchen-script Tibetan historical document, to solve the problems that the existing line segmentation algorithms for Tibetan historical documents fail to effectively segment touching text lines and have low segmentation efficiency.

In order to make the above objectives, features, and advantages of the present disclosure more straightforward and understandable, the present disclosure will be described in further detail below with reference to the accompanying drawings and detailed embodiments.

Figure 1:
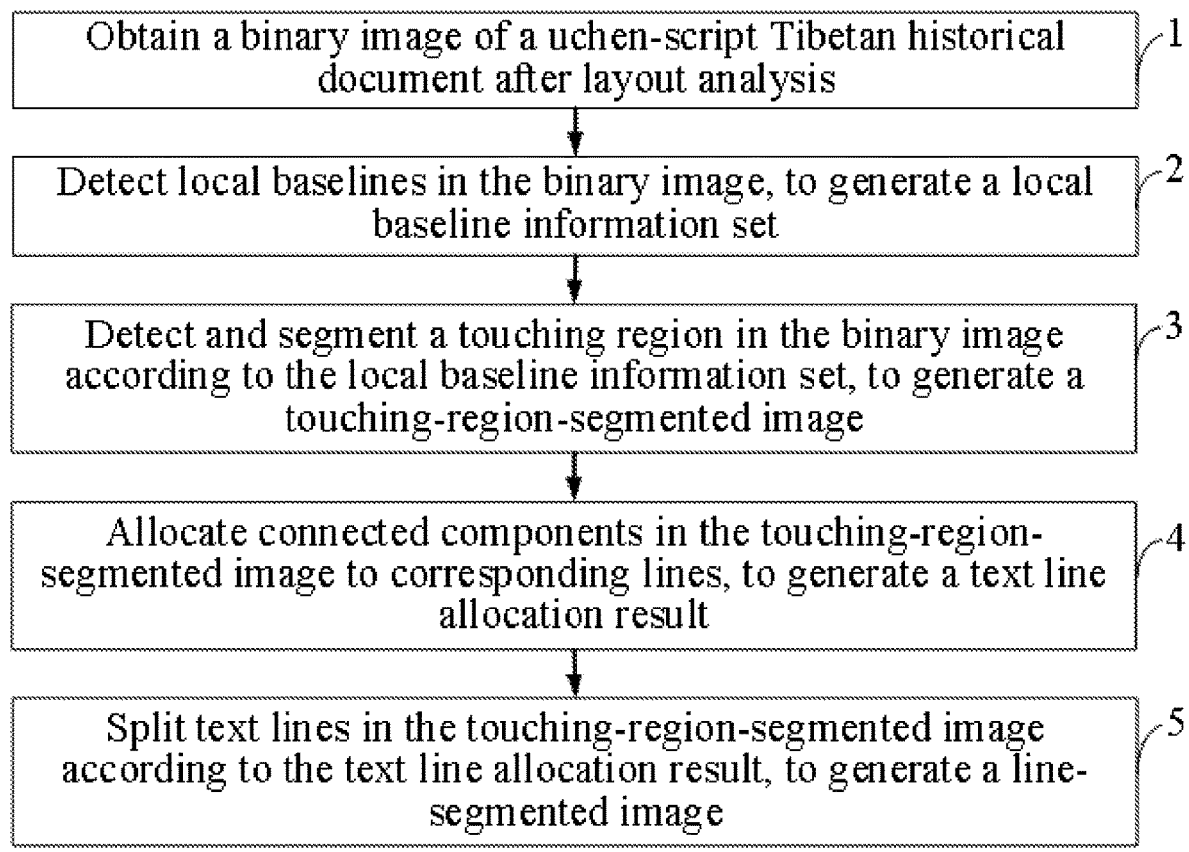
FIG. 1 is a flowchart of a method for segmenting touching text lines in an image of a uchen-script Tibetan historical document according to the present disclosure.

FIG. 1 is a flowchart of a method for segmenting touching text lines in an image of an uchen-script Tibetan historical document according to the present disclosure. Referring to FIG. 1, the method for segmenting touching text lines in an image of an uchen-script Tibetan historical document specifically includes the following steps:

Step 1: obtain a binary image of an uchen-script Tibetan historical document after layout analysis.

Figure 5:
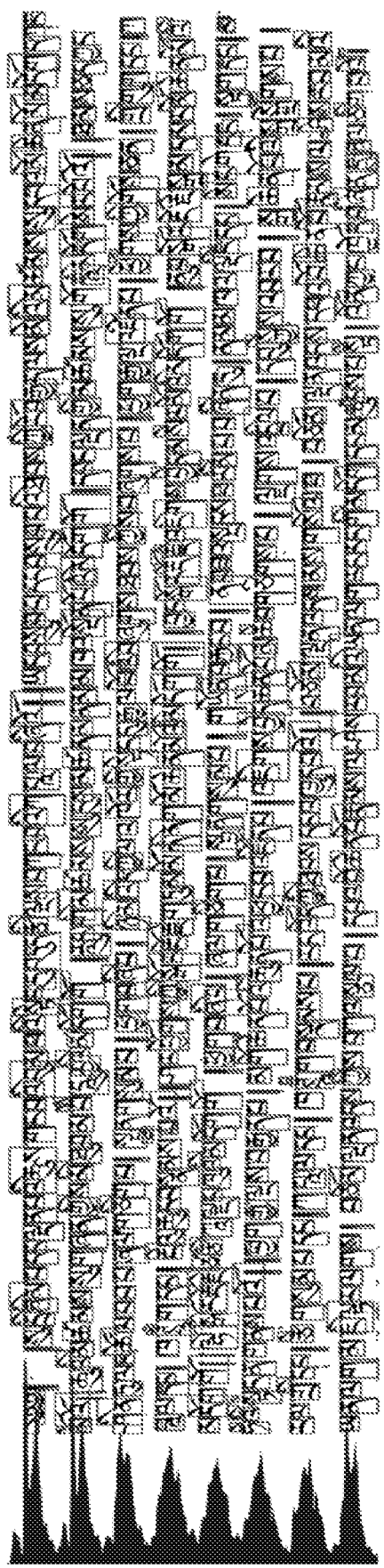
FIG. 5 is an example image subject to connected component detection and horizontal projection according to the present disclosure.

In this embodiment of the present disclosure, the obtained binary image of the uchen-script Tibetan historical document after layout analysis is as shown by the characters on the right side of FIG. 5. This paragraph of characters in the uchen-script Tibetan historical document has the following meaning:

The alms bowl which is located in the corner of lotus is filled with scented water, five amritas are filled in a Skullcup, and they are stirred over and over again to produce eight flavors, the wife of Aryashura is white and located at the fire corner, the wife of Ajita is green and located at the water corner, the Kali is blue and located at the wind corner, Wu Mo is yellow and located at the earth corner. Everything is youth, one face, three eyes, and four arms. The one who is sitting on the sun wheel in the king's gesture and naked has five Mudra, moon-shaped knife, Skullcup, Trifurcation and a drum in his hand, at the East gate there has a Vajravarahi with angry face and black body, at the North gate there has an another Vajravarahi with scared face and yellow body, at the West gate there has a Vajra with read body, at the South gate there has an another Vajra with green body. All of them have four arms, one face, three eyes, and right leg stretched out and without clothes, they are riding on Garuda, lions, tigers, and buffaloes respectively. The main character has a solemn five Mudra, a wreath of skeletons, Vajrabhairava's fangs, a curled tongue, raised hair and roared loudly. He is holding the sword, Trifurcation, Skullcup in his hand and with his wife in his arms. Bhagavan's wife named white Bhagavan asked him: How to know who is brave and wise. Bhagavan said: Brave and wise people have their own color, just like your face.

Step 2: detect local baselines in the binary image, to generate local baseline information set.

Unlike printed text lines, text lines in a woodblock uchen-script Tibetan historical document do not have clear baselines that are easy to obtain. Text lines in woodblock layout of a Tibetan historical document are twisted, tilted, and the like. Although a line does not have an integrated baseline, local baselines may be detected, and touching characters in adjacent lines are further detected on this basis.

Figure 2:
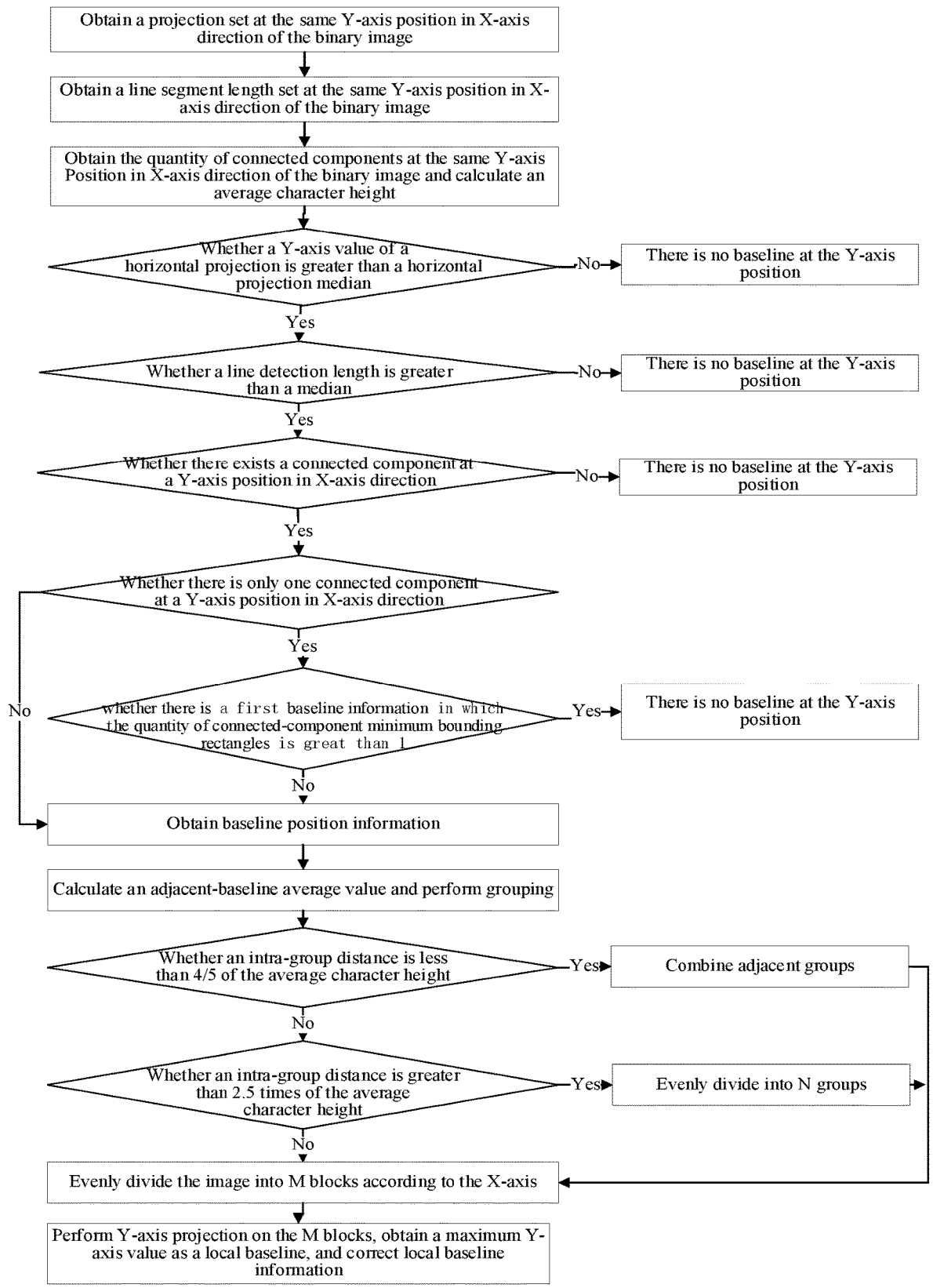
FIG. 2 is a flowchart of local baseline detection according to the present disclosure.

FIG. 2 is a flowchart of local baseline detection according to the present disclosure. As shown in FIG. 2, a method for local baseline detection in step 2 of the present disclosure specifically includes the following steps:

Step 2.1: project the binary image horizontally, and count a total quantity of foreground color pixels at each Y-axis position in X-axis direction, to generate a horizontal projection set.

In the present disclosure, a longitudinal Y-axis direction refers to a vertical direction of an image, and a lateral X-axis direction refers to a horizontal direction of an image. The total quantity of foreground color pixels at the same Y-axis position in the X-axis direction is counted, that is, the image is projected horizontally, to generate a horizontal projection set. The Y-axis position means a position on the Y-axis. A projection histogram is shown on the left side of FIG. 5. The length of the horizontal projection set is the height of the image, and each position in the horizontal projection set records the total quantity of foreground color pixels existing in the corresponding horizontal direction.

Step 2.2: search for line segments in the binary image by using a Hough line detection method, to generate a line segment length set at each Y-axis position in the X-axis direction.

Hough line detection is performed to search for line segments in the image. Angles and lengths of the line segments may be selected. A sum of lengths of line segments in the same longitudinal Y-axis direction is calculated, to generate a line segment length set. In the present disclosure, the line segment length set is generated according to a total height of the image. If there is no line segment in a certain horizontal direction, the corresponding value is 0 in the line segment length set; otherwise, the corresponding value is a sum of lengths of line segments in the horizontal direction. The line segment length set obtained herein is used for further determining baseline positions.

Step 2.3: determine, according to the horizontal projection set, a median of the horizontal projection set, the line segment length set, and a median of the line segment length set, baseline positions that possibly have baseline information, to generate a first baseline information set.

The median of the horizontal projection set is obtained, and it is determined whether values in the horizontal projection set are greater than the median of the horizontal projection set. If a value is greater than the median of the horizontal projection set, it is recorded that baseline information may exist; if a value is less than the median of the horizontal projection set, no baseline information exists. The median of the line segment length set is obtained, and it is determined whether values in the line segment length set are greater than the median of the line segment length set. If a value is greater than the line segment length median, it is recorded that baseline information may exist; if a value is less than the line segment length median, no baseline information exists. In this way, the first baseline information set is obtained.

Step 2.4: detect connected components in the binary image, to generate a connected component set at each Y-axis position in the X-axis direction.

Connected domains in the image are detected. One connected component is a connected character stroke in the binary image. The connected component set at each Y-axis position in the X-axis direction is generated.

Step 2.5: count the quantity of upper edges of connected-component minimum bounding rectangles at each Y-axis position in the X-axis direction according to the connected component set, to generate a bounding rectangle quantity set.

The quantity of upper edges of connected-component minimum bounding rectangles at the same Y-axis position in the X-axis direction is further counted, to generate the bounding rectangle quantity set. The minimum bounding rectangle of a connected component may be a minimum vertical rectangle enclosing the connected component.

Step 2.6: calculate an average character height according to the connected component set.

Height values of the connected-component minimum bounding rectangles are calculated. A height threshold is set to be heights of all the connected components divided by the quantity of all the connected components. A total quantity of connected components whose heights are greater than the height threshold and a total height of such connected components are obtained, and the total height of the connected components is divided by the total quantity of the connected components to obtain an average character height. A detection result of the connected components is shown by the rectangular frames in FIG. 5. The average character height is obtained herein to further estimate height information of the text line.

Step 2.7: filter the baseline positions in the first baseline information set according to the bounding rectangle quantity set and the average character height, to generate a second baseline information set.

It is determined whether the quantity of connected-component minimum bounding rectangles at each Y-axis position in the X-axis direction in the first baseline information set is 0; if the quantity is determined as 1 at a Y-axis position, the information at this position is deleted from the first baseline information set. It is determined whether the quantity of connected-component minimum bounding rectangles at each Y-axis position in the X-axis direction in the first baseline information set is 1; if the quality is determined as 1 at a certain Y-axis position it is further determined whether there is a first baseline information in which the quantity of connected-component minimum bounding rectangles is great than 1, from a position which is ½ of the average character height higher than the certain Y-axis position to a position which is ½ of the average character height lower than the certain Y-axis position, in X-axis direction; and if yes, the baseline information at this position is deleted from the first baseline information set, to obtain the second baseline information set. In the baseline information set, the Y-axis coordinate of each baseline position is stored sequentially in ascending order of Y-axis coordinate values.

Step 2.8: group the baseline positions in the second baseline information set according to the average character height, to determine text line position information.

A difference between each piece of data in the second baseline information set and its adjacent data on the right is determined. If the difference is greater than ⅓ of the average character height, an average value of the data and its adjacent data on the right is calculated as a grouping line. The first text line group is formed between a start position of a text region of the image and the first grouping line, and the last text line group is formed between the last grouping line and an end position of the text region of the image. For other grouping lines, each grouping line is combined with the next grouping line thereof, to form a text line. The start position of the text region of the image is a Y-axis coordinate of the first non-zero value in the horizontal projection set, and the end position of the text region of the image is a Y-axis coordinate of the last non-zero value in the horizontal projection set.

Figure 6:
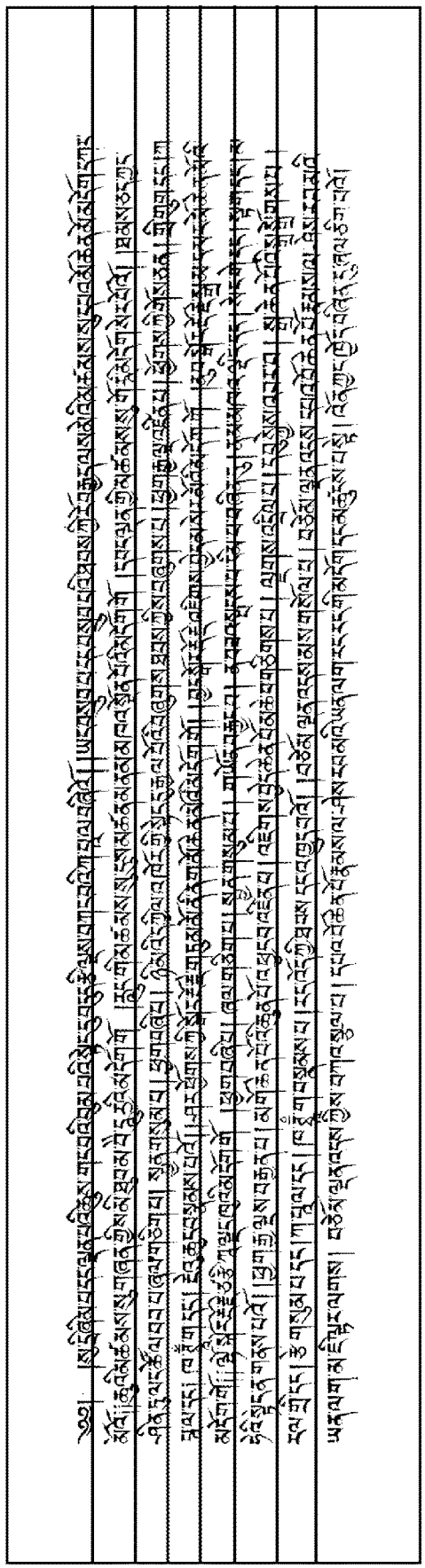
FIG. 6 is an example image illustrating positions of text lines according to the present disclosure.

Incorrect grouping may occur in the text lines formed through the foregoing processing, which needs to be corrected. If the height of a text line is less than ⅘ of the average character height, incorrect grouping may occur in the text. If the group where incorrect grouping occurs is the first group, the group is combined with a next group. If the group where incorrect grouping occurs is the last group, the group is combined with a previous group. In other cases, inter-group distances between the group where incorrect grouping occurs and its previous group and next group are calculated, and the group is combined with its adjacent previous or next group with a smaller inter-group distance. If the height of the text line is greater than 2.5 times of the average character height, the text line is evenly divided into N text lines, where N=(height of the text line/average character height). If N is not an integer, N is rounded down. The finally determined text line position information is as shown in FIG. 6, in which areas of various text lines are shown as areas enclosed by rectangles.

Step 2.9: determine each local baseline according to the text line position information, to generate the local baseline information set.

The image is evenly segmented into M blocks according to X-axis of the image, and Y-axis horizontal projection is performed on the M blocks respectively. According to the position information of the text line, in each block of image, a position with a maximum Y-axis projection value is searched for, to be used as a baseline position of each block of image, namely, local baseline information. Experiments show that an optimal result is obtained when M=8. Therefore, in this embodiment of the present disclosure, after the image is divided into 8 blocks along the X-axis, the local baseline information set is generated. A storage form of the local baseline information is the same as that of the baseline positions in the baseline information set. That is, the Y-axis coordinate of each local baseline in the local baseline information set is stored sequentially in ascending order of Y-axis coordinates.

Step 2.10: calculate an average baseline distance of the text lines by using the local baseline information, and detect whether the local baselines have an error according to the average baseline distance of the text lines, so as to correct the local baseline information.

When the position with the maximum Y-axis projection value is used as the baseline position of each block of image, due to binarization, noise in the image, and other factors, errors may occur in a small portion of the obtained local baselines, and need to be corrected. In a correction process, the following steps are sequentially performed on the first text line to the second text line from the bottom:

Step 2.10.1: calculate a sum of local baseline distance differences between a current text line and a text line below, and divide the sum of baseline distance differences by M to obtain an average distance from a baseline position of the current text line to a baseline position of the text line below, where the average distance is recorded as the average baseline distance of the text lines.

Step 2.10.2: sequentially calculate the local baseline distance difference between the current text line and the text line below; if the local baseline distance difference is less than 0.85 times of the average baseline distance of the text lines or greater than 1.15 times of the average baseline distance of the text lines, determine that the local baseline is incorrect local baseline information, and record a block position after the local baselines in the current text line and the text line below are located in the image block.

Step 2.10.3: look for a correct local baseline closest to an incorrect local baseline block relationship in local baselines of the same text line, and correct a position of the incorrect local baseline to be a position of the correct local baseline, to complete the local baseline correction.

Figure 7:
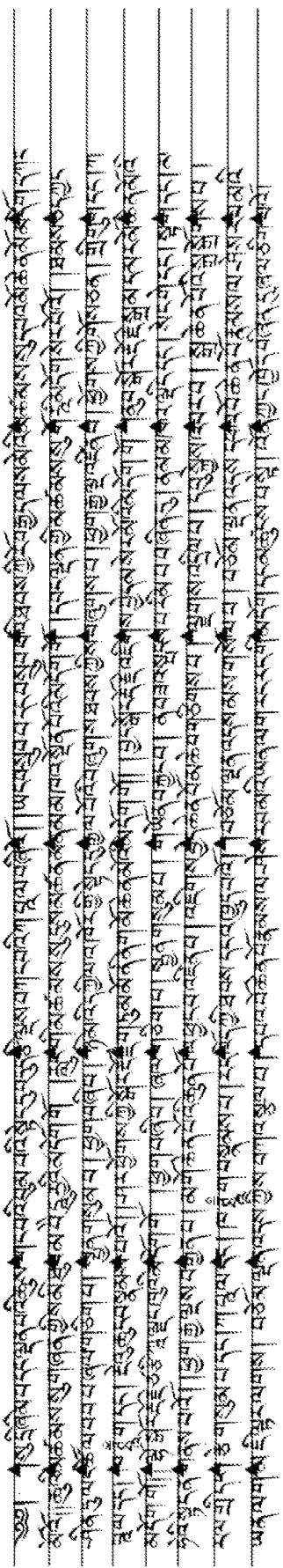
FIG. 7 is an example local baseline image after the image is divided into 8 parts along X-axis according to the present disclosure.

In this embodiment of the present disclosure, the image is divided into 8 blocks along the X-axis, and the local baseline information obtained after calculation and correction of the local baselines is as shown in FIG. 7, in which dividing positions in the baseline are indicated with black triangles.

Step 3: detect and segment a touching region in the binary image according to the local baseline information set, to generate a touching-region-segmented image.

Figure 3:
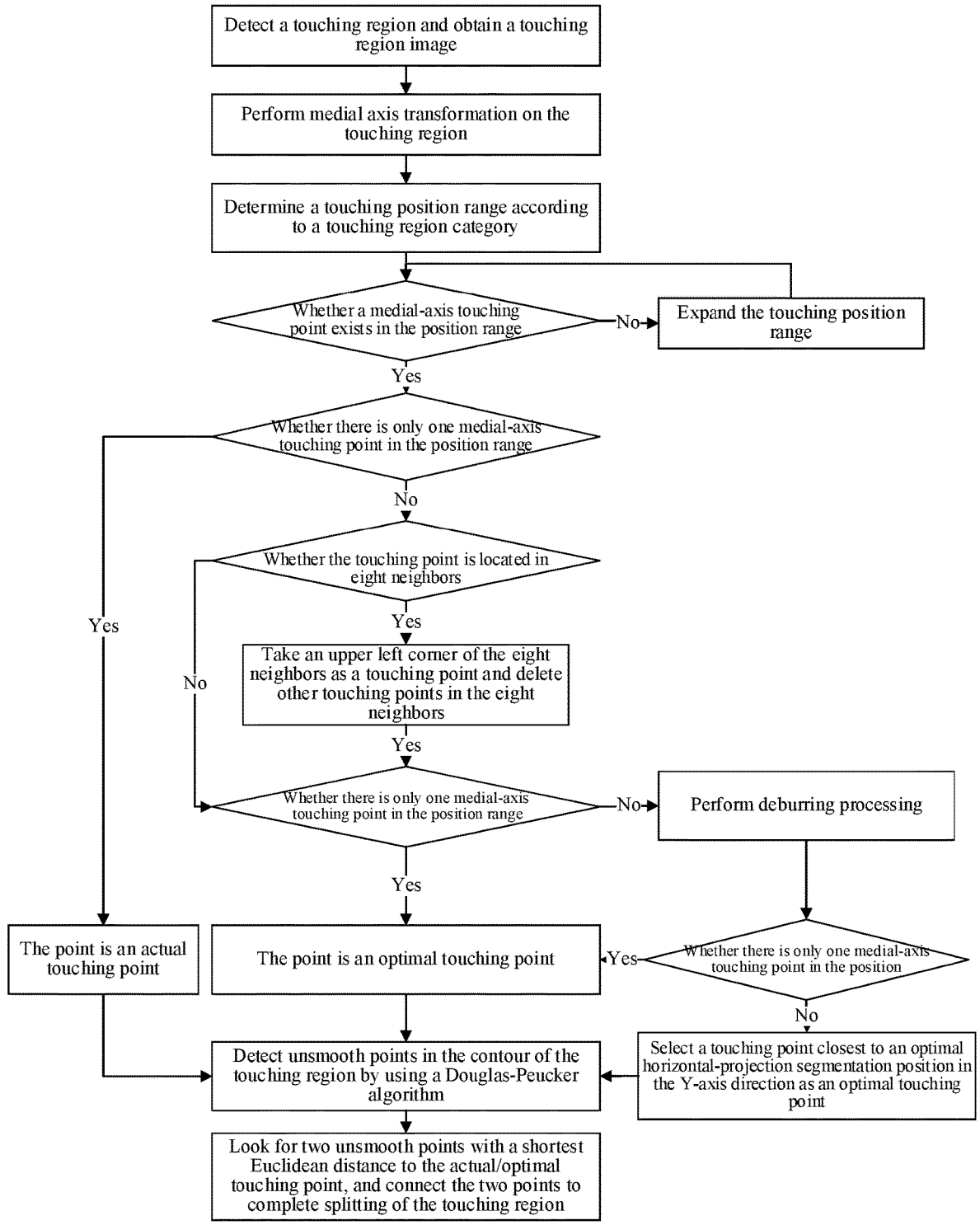
FIG. 3 is a flowchart of touching region detection and segmentation according to the present disclosure.

FIG. 3 is a flowchart of touching region detection and segmentation according to the present disclosure. Referring to FIG. 3, step 3 specifically includes the following steps:

Step 3.1: determine a touching region according to the connected component set and the local baseline information set.

Figure 8:
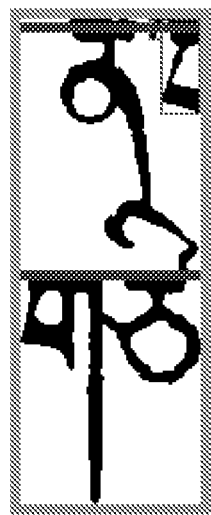
FIG. 8 is a schematic diagram of a first-category touching region according to the present disclosure.
Figure 9:
FIG. 9 is a schematic diagram of a first-category touching region after removal of a non-touching region according to the present disclosure.

Step 3.1 specifically includes the following steps:

Step 3.1.1: determine whether a connected component passing through two vertically adjacent local baselines exists in the binary image, and if yes, determine the connected component as a first-category touching region. The detected first-category touching region is as shown in FIG. 8. A minimum bounding rectangle of the touching region is calculated and extracted, and connected component detection is further performed inside the rectangle. If other connected components exist inside the rectangle, it is determined whether the height and width of each connected component in the bounding rectangle are equal to the height and width of the minimum bounding rectangle; if not, the connected component inside is recorded as an irrelevant region and is deleted. A result of the first-category touching region after removal of the non-touching region is as shown in FIG. 9.

Figure 10:
FIG. 10 is a schematic diagram of template images used in a template matching algorithm according to the present disclosure.
Figure 10:
Figure 10:
Figure 10:
Figure 11:
FIG. 11 is a schematic diagram of a second-category touching region after removal of a non-touching region according to the present disclosure.

Step 3.1.2: determine whether the binary image includes such a connected component that a distance from a height at the bottom of the connected component to a Y-axis of a local baseline under the connected component is less than 10; if such a connected component exists, a minimum bounding rectangle of the connected component is calculated and extracted, and connected component detection is further performed inside the rectangle. If other connected components exist inside the rectangle, it is determined whether the height and width of each connected component in the bounding rectangle are equal to the height and width of the minimum bounding rectangle; if not, the connected component inside is recorded as an irrelevant region and is deleted. Template matching is performed on the connected component and a template image set by using a standard correlation method; a matching degree and a position of a matching result are returned after the template matching. If the matching degree returned in the template matching result is greater than 0.5 and a distance from a height at the bottom of the position of the matching result to the bottom of the connected component is less than 3, the connected component is a second-category touching region. Some images in the used template image set are as shown in FIG. 10. A result of the second-category touching region after removal of the non-touching region is as shown in FIG. 11.

The first-category touching region and the second-category touching region obtained after the processing of step 3.1.1 and step 3.1.2 are both connected components with adhesion. Therefore, the first-category touching region and the second-category touching region are both touching regions that require processing of step 3.2.

Step 3.2: perform medial axis transformation on the touching region, to generate a transformed touching region.

Figure 12:
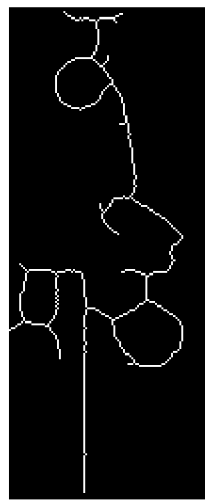
FIG. 12 is a schematic diagram of a medial axis transformation result of a touching region according to the present disclosure.

First, medial axis transformation is performed on the touching region. After medial axis transformation, stroke information is thinned to be lines, and the transformed touching region is generated. A result of the transformed touching region is as shown in FIG. 12.

Step 3.3: determine a touching point in the transformed touching region according to the local baseline information set and the average character height.

The first-category touching region passes through at least two vertically adjacent local baselines, and a touching position appears in a character stroke above the lower baseline and a character stroke on top of it. Therefore, a touching position range of the first-category touching region is located between a position which is ½ of the average character height lower than the upper baseline to a position which is ⅕ of the average character height higher than the lower baseline. A touching position range of the second-category touching region is located between a position which is ⅕ of the average character height higher than the top height of the matching result to a position which is ⅕ of the average character height lower than the top height of the matching result.

The quantity of medial-axis points in 8 neighbors of each point on the medial axis in the touching position range is calculated, and if the quantity is greater than 2, the point is a touching point.

When there is only one touching point, the point is the actual touching point, and step 3.4 is performed. When there are multiple touching points, an optimal touching point needs to be found. First, it is determined whether the touching points are located in eight neighbors of the same point, and if yes, a point at the upper left of the eight neighbors is taken as the touching point, and other touching points in the eight neighbors are deleted from the transformed touching region; if there is only one touching point after the processing, the touching point is the optimal touching point; otherwise, deburring processing is performed on a result obtained after the repeated touching points are removed from the eight neighbors. The purpose of the deburring processing is to remove pseudo-branches generated due to the medial axis transformation algorithm. Due to the pseudo-branches, pseudo-touching points may be generated. Therefore, this step is performed to delete the pseudo-touching points, thereby precisely positioning the optimal touching point.

Figure 14:
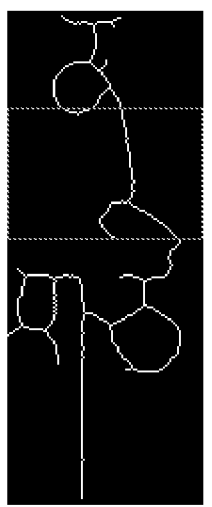
FIG. 14 is a schematic diagram of a deburred touching position according to the present disclosure.
Figure 14:
Figure 15:
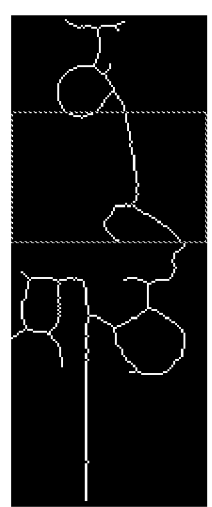
FIG. 15 is a schematic diagram of looking for an optimal touching point according to the present disclosure.
Figure 15:

A stroke width in the touching position range is calculated by using a Stroke Width Transform (SWT) algorithm, to delete medial axis lines thinner than the stroke width, and then step 3.4 is performed. This step is performed to delete some pseudo-branches caused by the medial axis transformation algorithm, and pseudo-touching points can be deleted after deletion of such pseudo-branches, thereby precisely positioning the optimal touching point. The quantity of touching points in this case is calculated. If there is only one touching point, the touching point is the optimal touching point; otherwise, the touching position range is projected horizontally, and a Y-axis coordinate of a minimum value among horizontal projection results is recorded as an optimal horizontal-projection segmentation position, and a touching point closest to the optimal horizontal-projection segmentation position in the Y-axis direction is selected as the optimal touching point. A deburring effect of the touching position is as shown in FIG. 14. The found optimal touching point is as shown in FIG. 15.

Step 3.4: detect unsmooth points in the touching region by using a Douglas-Peucker algorithm to obtain X-axis coordinates and Y-axis coordinates of the unsmooth points, and sequentially store the X-axis coordinates and Y-axis coordinates into a candidate splitting list.

Figure 13:
FIG. 13 is a schematic diagram of a result of smooth point detection in a touching region performed by using a Douglas-Peucker algorithm according to the present disclosure.

In step 3.2, medial axis transformation is first performed on the touching region. After medial axis transformation, the stroke information is thinned to be lines. Then, contour detection is performed on an image inside the minimum bounding rectangle. Unsmooth points in the result of the contour detection are detected by using the Douglas-Peucker algorithm, to obtain the X-axis coordinates and the Y-axis coordinates of the unsmooth points. An unsmooth point with a minimum Y-axis coordinate is found and used as a start point, and the X-axis coordinates and the Y-axis coordinates of the unsmooth points are sequentially stored into the candidate splitting list in a clockwise order of the image contour. A result of the transformed touching region is as shown in FIG. 12, and a result of the Douglas-Peucker algorithm is as shown in FIG. 13.

Step 3.5: look for optimal segmentation points from the candidate splitting list according to the touching point.

Points in the touching position range are sequentially retrieved from the candidate splitting list, to form a new candidate splitting list. Then, a point with a maximum Y-axis coordinate is looked for in the new candidate splitting list, and the candidate splitting list is divided into two parts by using this point. The storage of the candidate splitting list includes the following steps: looking for an unsmooth point with a minimum Y-axis coordinate as a start point, and sequentially storing the X-axis coordinates and the Y-axis coordinates of the unsmooth points into the candidate splitting list in a clockwise order of the image contour. Therefore, by using the point with the maximum Y-axis coordinate, the character is divided into two parts: one part is from the first point of the new candidate splitting list to the point with the maximum Y-axis coordinate, and the other part is from the point with the maximum Y-axis coordinate to the last point of the new candidate splitting list. In each part of the candidate splitting list, a point with a shortest Euclidean distance to the touching point is looked for and used as an optimal segmentation point (or referred to as an optimal splitting point).

Step 3.6: connect the optimal segmentation points to generate a splitting line.

Figure 16:
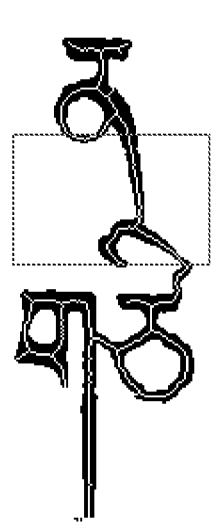
FIG. 16 is a schematic diagram of looking for optimal segmentation points according to the present disclosure.
Figure 16:
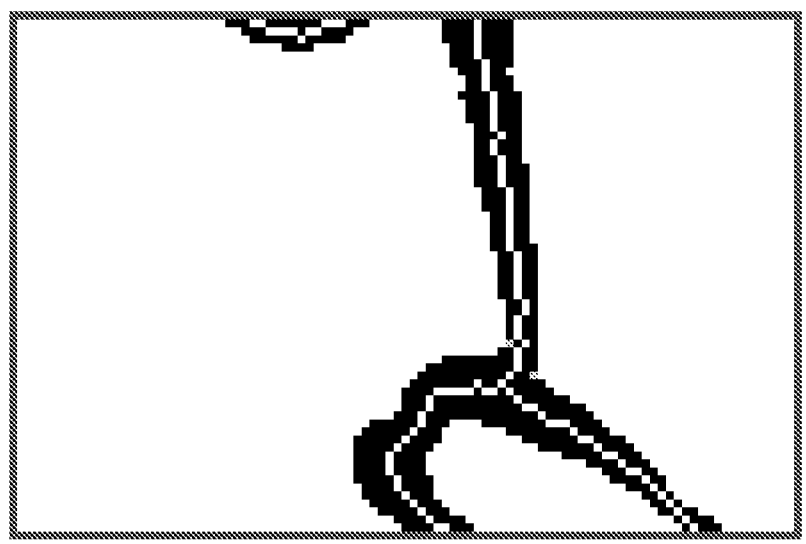
Figure 17:
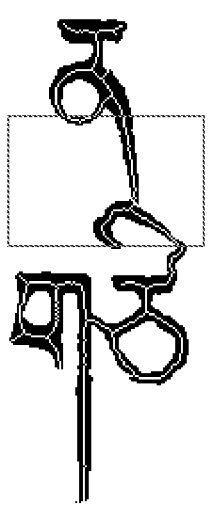
FIG. 17 is a schematic diagram of touching region segmentation according to the present disclosure.
Figure 17:
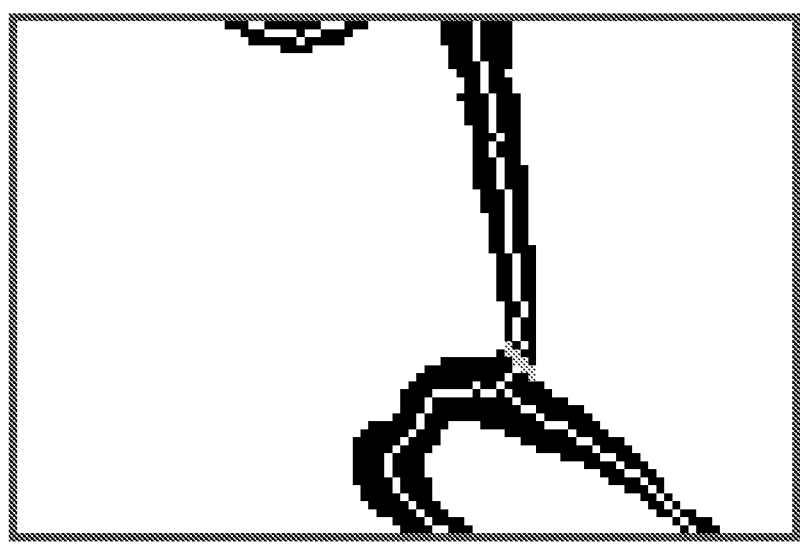

Two optimal splitting points are connected to generate the splitting line. The touching point of the touching stroke is split by using the splitting line, thereby completing the segmentation. The found optimal segmentation points are as shown in FIG. 16. The splitting line formed by connecting the optimal segmentation points is as shown in FIG. 17.

Step 3.7: segment the touching region by using the splitting line, to generate the touching-region-segmented image.

After step 3.7 is finished, the complete-touching region between text lines is segmented, and there is no adhesion between text lines after the segmentation. After the segmentation of the adhesion, the connected components are allocated to corresponding lines.

Step 4: allocate connected components in the touching-region-segmented image to corresponding lines, to generate a text line allocation result.

Figure 4:
FIG. 4 is a flowchart of allocating connected components to corresponding lines according to the present disclosure.

FIG. 4 is a flowchart of allocating connected components to corresponding lines according to the present disclosure. Referring to FIG. 4, step 4 specifically includes the following steps:

Step 4.1: traverse all the connected components in the connected component set, and directly allocate a connected component passing through a local baseline to a text line where the local baseline is located.

After completion of the adhesion segmentation, connected component information has changed. Therefore, connected components in the image after the segmentation of the touching region are detected again, to generate a new connected component set. All the connected components are traversed, a connected component passing through a local baseline is directly allocated to a text line where the local baseline is located, to complete primary allocation. After the primary allocation is calculated, a maximum distance from an upper edge of the allocated connected component to a local baseline position is used as a maximum distance from a baseline to a bounding rectangle.

Step 4.2: allocate, according to position relationships between the connected components and the first local baseline in the local baseline information set, a connected component of the first text line.

If a connected component is located above the first local baseline, the connected component is allocated to the first text line.

Step 4.3: allocate, according to position relationships between the connected components and the last local baseline in the local baseline information set, a connected component of the last text line.

If a connected component is located below the last local baseline, the connected component is allocated to the last text line.

Step 4.4: allocate, according to distances from barycenter coordinates of the connected component to adjacent local baselines thereof, the connected component to an adjacent text line, to generate the text line allocation result. Step 4.4 specifically includes the following steps:

Step 4.4.1: calculate distances from the barycenter coordinates of the connected component to an upper local baseline and a lower local baseline thereof; if the distance from the barycenter coordinates to the upper local baseline is less than the distance from the barycenter coordinates to the lower local baseline, allocate the connected component to an upper text line, to complete allocation of the connected component. Otherwise, step 4.4.2 is performed.

Step 4.4.2: if the distance from the barycenter coordinates of the connected component to the upper local baseline is greater than the distance from the barycenter coordinates to the lower local baseline and the distance from the barycenter coordinates of the connected component to the lower local baseline is less than the maximum distance from a baseline to a bounding rectangle, calculate whether the length of the minimum bounding rectangle of the connected component is greater than 3 times of the width of the minimum bounding rectangle of the connected component; if yes, allocate the connected component to the upper text line; otherwise, allocate the connected component to the lower text line, to complete allocation of the connected component.

Step 4.4.3: if the distance from the barycenter coordinates of the connected component to the upper local baseline is greater than the distance from the barycenter coordinates to the lower local baseline and the distance from the barycenter coordinates of the connected component to the lower local baseline is greater than the maximum distance from a baseline to a bounding rectangle, perform Hough circle detection on the connected component, where a maximum radius of the Hough circle detection is the width of the connected component, and a minimum radius of the Hough circle detection is ½ of the width of the connected component. If a detection result indicates that a circle exists, the connected component is allocated to the lower text line, to complete allocation of the connected component. If the detection result indicates that no circle exists, a distance from the connected component to an upper character region is compared with a distance from the connected component to a lower character region; if the distance from the connected component to the upper character region is smaller, the connected component is allocated to the upper text line; otherwise, the connected component is allocated to the lower text line, to complete allocation of the connected component.

After step 4.4 is finished, the connected components of the entire image are allocated. All the connected components in the image are allocated to corresponding text lines according to an allocation rule, and the text lines can be segmented only after the allocation is completed. The allocation is a prerequisite for the subsequent text line splitting.

Step 5: split text lines in the touching-region-segmented image according to the text line allocation result, to generate a line-segmented image. Step 5 specifically includes the following steps:

Step 5.1: generate a text line image mask according to the text line allocation result.

According to the allocation result of each text line in the text line allocation result, a difference between a top height and a bottom height of the connected components in each text line is calculated as a text line height, so that an image with a width being an input image width and a height being the text line height is generated as the text line image mask.

After the text line mask information is obtained in step 5.1, it only needs to perform an operation on connected components belonging to a certain text line in the text line allocation result and the text line mask.

Step 5.2: perform an AND operation on connected components in each text line of the text line allocation result and the text line image mask, to generate a text line splitting result.

Step 5.2.1: extract, according to the allocation result of each text line, connected component information of the text line, and perform connected component detection inside a minimum bounding rectangle of any connected component belonging to the line. If there are multiple connected components in the rectangle, it is determined whether the height and width of each internal connected component of the connected component are equal to the height and width of the connected component, and any connected component not meeting the condition is deleted from the minimum bounding rectangle, thereby obtaining the minimum bounding rectangle of the connected component. The rectangle does not include content other than the connected component. In this way, when an AND operation is performed on the connected component in the image and the text line mask image, content of other text regions in the minimum bounding rectangle can be reduced, thereby extracting the connected component more accurately.

Step 5.2.2: calculate a difference between a Y-axis coordinate of the extracted connected component in the image from which the connected component is extracted and a top height of the connected component in the text line where the connected component is located, and use the difference as a Y-axis coordinate of the connected component in the text line, while maintain an X-axis coordinate unchanged.

When a text line is generated, only the height of the text line is generated. Y-axis coordinates of all the connected components belonging to the line in the original image are deviated from the coordinate of the generated text line. Therefore, step 5.2.2 is performed, to calculate Y-axis offsets. After this step is performed, correct coordinate information can be directly found for the subsequent step of "performing an AND operation on the connected component information and the text line image mask."

Figure 18:
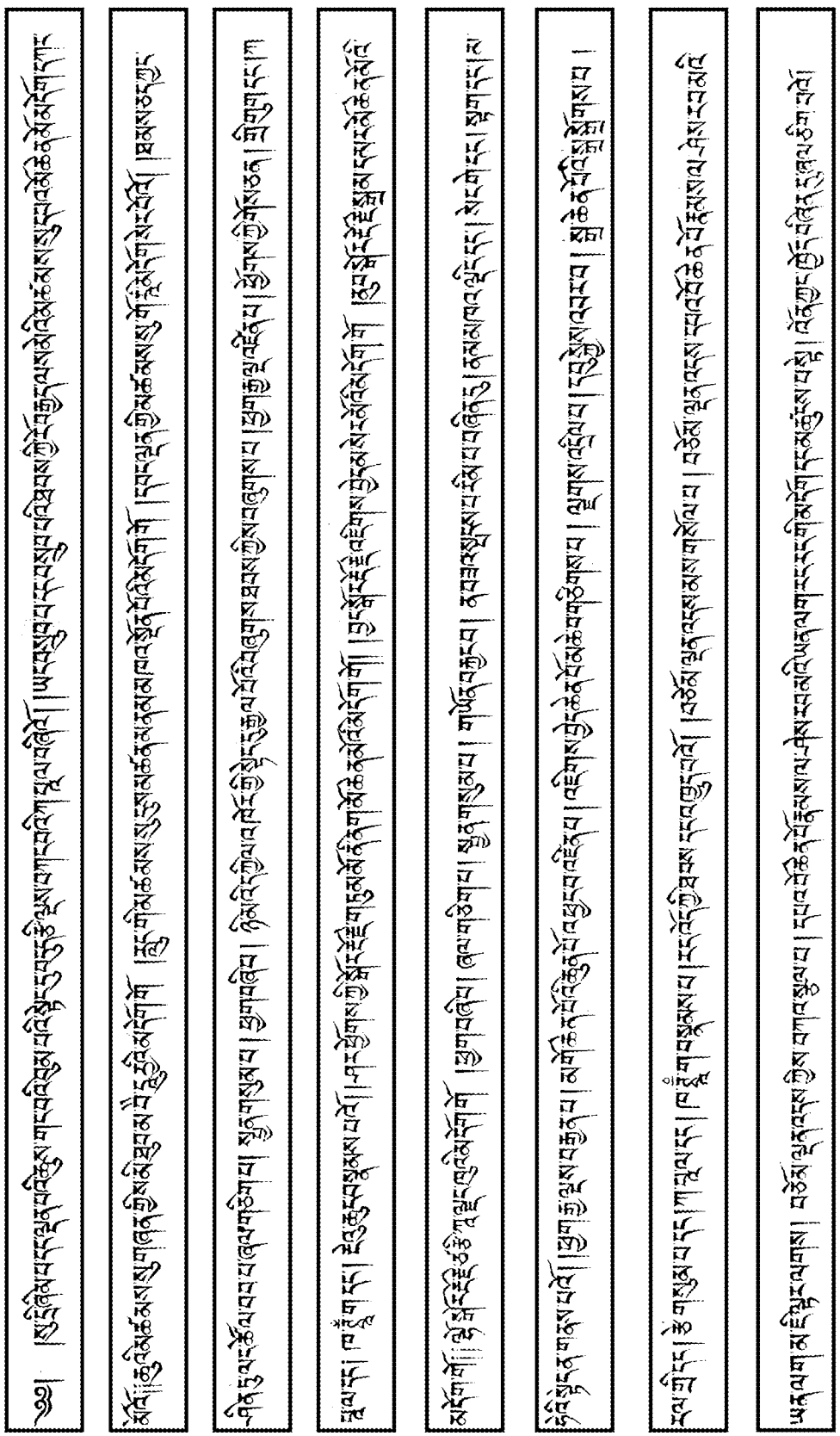
FIG. 18 is an example image of a text line segmentation result according to the present disclosure.

Step 5.2.3: copy the connected component information into the text line image mask, that is, perform an AND operation on the connected component and a position where the connected component is located in the text line image mask, to obtain the text line splitting result. The text line splitting result is as shown in FIG. 18.

Step 5.3: output the text line splitting result in the form of an image, to generate the line-segmented image.

In the present disclosure, the text line image mask is generated through step 5.1, and an AND operation is performed on the connected component information and the text line mask through step 5.2, thereby obtaining the text line image. Therefore, after splitting of each line is completed, the text line splitting result is outputted in the form of an image, and each text line corresponds to one text line image. FIG. 18 shows a line-segmented image corresponding to the entire image, while an actual splitting result is an image of each text line.

For the text line splitting problem, the patent entitled "line segmentation method and system for Tibetan historical document" (Patent No.: 201711206538.8) only solves the line segmentation problem of an image of a Tibetan historical document without adhesion, but does not focus on segmentation for adhesion. Moreover, text line segmentation is performed by using a contour tracking method, and the method is theoretically more time-consuming. According to the thesis of the inventor of the patent (Zhou, Fengming&Wang, Weilan&Lin, Qiang. (2018). A novel text segmentation method for Tibetan historical document based on contour curve tracking. International Journal of Pattern Recognition and Artificial Intelligence. 32. 10.1142/50218001418540253), the segmentation accuracy is 83.27%, while the method for segmenting touching text lines provided in the present disclosure achieves a segmentation accuracy of 96.52%, which greatly improves the segmentation accuracy of touching text lines in a uchen-script Tibetan historical document image.

For the segmentation for adhesion in a document image, a projection method is adopted in most existing approaches. However, the projection method cannot accurately find the optimal segmentation point, and the method is easily affected by a non-touching region. If segmentation is performed by using a neural network method, a large amount of labeled data is required, and it is difficult to train a neural network model. Unlike printed Tibetan characters, characters in an image of a Tibetan historical document have different heights and there is no horizontal projection gap between text lines. The present disclosure provides a method for segmenting touching text lines in an image of a Tibetan historical document, which is adapted to any type of text line adhesion; moreover, line segmentation can be completed without a large amount of labeled data, so that the segmentation efficiency of text lines in a Tibetan historical document is greatly improved.

In another specific implementation, the local baselines of the text lines in step 2 may alternatively be obtained in the following manners:

(1) During obtaining of the local baselines, the image may be first split into blocks along the X-axis, and then baselines in independent blocks are obtained, thereby obtaining the local baselines.

(2) During obtaining of the local baseline information, the baseline information may be searched for by using a neural network or the like.

(3) The local baseline information may be obtained through other conventional methods.

Segmentation of the touching region in step 3 may alternatively be completed in the following manners:

(1) The touching points may be selected through skeletonization or thinning instead of medial axis transformation.

(2) Candidate splitting points may be obtained through other methods.

(3) If no touching point can be found, the image may be projected from the inside to the outside through a skeletonization result/medial axis transformation result, to find a minimum projection value for segmentation.

Splitting of the text lines in step 5 may alternatively be completed in the following manners:

(1) If a bounding frame of a connected component includes multiple connected components therein, redundant connected components may be deleted according to area sizes, start position coordinates, and the like, and then the connected components in the frame are further processed.

(2) If a bounding frame of a connected component includes multiple connected components therein, the largest connected component may be first filled through a graphic operation, and then redundant connected components are deleted by performing an OR operation with the original image or by using other methods. Then, the connected components in the frame are further processed.

(3) Template images with the same size as the text lines may be generated, and then a matrix duplication operation may be directly performed according to the X-axis and Y-axis coordinates of the connected components, thereby obtaining a text line segmented image.

Based on the method for segmenting touching text lines in an image of a uchen-script Tibetan historical document provided in the present disclosure, the present disclosure further provides a system for segmenting touching text lines in an image of a uchen-script Tibetan historical document. The system includes:

a binary image obtaining module, configured to obtain a binary image of a uchen-script Tibetan historical document after layout analysis;

a local baseline detection module, configured to detect local baselines in the binary image, to generate a local baseline information set;

a touching-region detection and segmentation module, configured to detect and segment a touching region in the binary image according to the local baseline information set, to generate a touching-region-segmented image;

a module for allocation of connected components to corresponding lines, configured to allocate connected components in the touching-region-segmented image to corresponding lines, to generate a text line allocation result; and a text line splitting module, configured to split text lines in the touching-region-segmented image according to the text line allocation result, to generate a line-segmented image.

The local baseline detection module specifically includes:

a horizontal projection unit, configured to project the binary image horizontally, and count a total quantity of foreground color pixels in each Y-axis position in X-axis direction, to generate a horizontal projection set;

a Hough line detection unit, configured to search for line segments in the binary image by using a Hough line detection method, to generate a line segment length set in each Y-axis position in X-axis direction;

a first-baseline-information-set determining unit, configured to determine, according to the horizontal projection set, a median of the horizontal projection set, the line segment length set, and a median of the line segment length set, baseline positions that possibly have baseline information, to generate a first baseline information set;

a connected component detection unit, configured to detect connected components in the binary image, to generate a connected component set in each Y-axis position in X-axis direction;

a bounding-rectangle-quantity counting unit, configured to count the quantity of upper edges of connected-component minimum bounding rectangles in each Y-axis position in X-axis direction according to the connected component set, to generate a bounding rectangle quantity set;

an average-character-height calculating unit, configured to calculate an average character height according to the connected component set;

a baseline position filtering unit, configured to filter the baseline positions in the first baseline information set according to the bounding rectangle quantity set and the average character height, to generate a second baseline information set;

a baseline position grouping unit, configured to group the baseline positions in the second baseline information set according to the average character height, to determine text line position information; and a local baseline determining unit, configured to determine each local baseline according to the text line position information, to generate the local baseline information set.

The touching-region detection and segmentation module specifically includes:

a touching region determining unit, configured to determine a touching region according to the connected component set and the local baseline information set;

a medial axis transformation unit, configured to perform medial axis transformation on the touching region, to generate a transformed touching region;

a touching point determining unit, configured to determine a touching point in the transformed touching region according to the local baseline information set and the average character height;

an unsmooth point detection unit, configured to detect unsmooth points in the touching region by using a Douglas-Peucker algorithm to obtain X-axis coordinates and Y-axis coordinates of the unsmooth points, and sequentially store the X-axis coordinates and Y-axis coordinates into a candidate splitting list;

an optimal-segmentation-point determining unit, configured to look for optimal segmentation points from the candidate splitting list according to the touching point;

a splitting line generating unit, configured to connect the optimal segmentation points to generate a splitting line; and a touching region segmenting unit, configured to segment the touching region by using the splitting line, to generate the touching-region-segmented image.

The module for allocation of connected components to corresponding lines specifically includes:

a first unit for allocation of connected components to corresponding lines, configured to traverse all the connected components in the connected component set, and directly allocate a connected component passing through a local baseline to a text line where the local baseline is located;

a second unit for allocation of connected components to corresponding lines, configured to allocate, according to position relationships between the connected components and the first local baseline in the local baseline information set, a connected component of the first text line;

a third unit for allocation of connected components to corresponding lines, configured to allocate, according to position relationships between the connected components and the last local baseline in the local baseline information set, a connected component of the last text line; and a fourth unit for allocation of connected components to corresponding lines, configured to allocate, according to distances from barycenter coordinates of the connected component to adjacent local baselines thereof, the connected component to an adjacent text line, to generate the text line allocation result.

The text line splitting module specifically includes:

a text-line-image-mask generating unit, configured to generate a text line image mask according to the text line allocation result;

an AND operation unit, configured to perform an AND operation on connected components in each text line of the text line allocation result and the text line image mask, to generate a text line splitting result; and a text-line-segmentation-result output unit, configured to output the text line splitting result in the form of an image, to generate the line-segmented image.

Each embodiment of the present specification is described in a progressive manner, each embodiment focuses on the difference from other embodiments, and for the same and similar parts between the embodiments, reference may be made to each other. For the system disclosed in the embodiments, since the system corresponds to the method disclosed in the embodiments, the description is relatively simple, and reference can be made to the description of the method.

In this specification, several specific embodiments are used for illustration of the principles and implementations of the present disclosure. The description of the foregoing embodiments is used to help illustrate the method of the present disclosure and the core ideas thereof. In addition, those of ordinary skill in the art can make various modifications in terms of specific implementations and scope of application in accordance with the ideas of the present disclosure. In conclusion, the content of this specification shall not be construed as a limitation to the present disclosure.

What is claimed is:

1. A method for segmenting touching text lines in an image of a uchen-script Tibetan historical document, comprising:

obtaining a binary image of a uchen-script Tibetan historical document after layout analysis;

detecting local baselines in the binary image, to generate a local baseline information set;

detecting and segmenting a touching region in the binary image according to the local baseline information set, to generate a touching-region-segmented image;

allocating connected components in the touching-region-segmented image to corresponding lines, to generate a text line allocation result; and splitting text lines in the touching-region-segmented image according to the text line allocation result, to generate a line-segmented image, wherein the detecting local baselines in the binary image to generate a local baseline information set comprises:

projecting the binary image horizontally, and counting a total quantity of foreground color pixels in each Y-axis position in X-axis direction, to generate a horizontal projection set;

searching for line segments in the binary image by using a Hough line detection method, to generate a line segment length set in each Y-axis position in X-axis direction;

determining, according to the horizontal projection set, a median of the horizontal projection set, the line segment length set, and a median of the line segment length set, baseline positions that possibly have baseline information, to generate a first baseline information set;

detecting connected components in the binary image, to generate a connected component set in each Y-axis position in X-axis direction;

counting the quantity of upper edges of connected-component minimum bounding rectangles in each Y-axis position in X-axis direction according to the connected component set, to generate a bounding rectangle quantity set;

calculating an average character height according to the connected component set;

filtering the baseline positions in the first baseline information set according to the bounding rectangle quantity set and the average character height, to generate a second baseline information set;

grouping the baseline positions in the second baseline information set according to the average character height, to determine text line position information; and determining each local baseline according to the text line position information, to generate the local baseline information set.

2. The method for segmenting touching text lines according to claim 1 wherein the detecting and segmenting a touching region in the binary image according to the local baseline information set to generate a touching-region-segmented image specifically comprises:

determining a touching region according to the connected component set and the local baseline information set;

performing medial axis transformation on the touching region, to generate a transformed touching region;

determining a touching point in the transformed touching region according to the local baseline information set and the average character height;

detecting unsmooth points in the touching region by using a Douglas-Peucker algorithm to obtain X-axis coordinates and Y-axis coordinates of the unsmooth points, and sequentially storing the X-axis coordinates and Y-axis coordinates into a candidate splitting list;

looking for optimal segmentation points from the candidate splitting list according to the touching point;

connecting the optimal segmentation points to generate a splitting line; and segmenting the touching region by using the splitting line, to generate the touching-region-segmented image.

3. The method for segmenting touching text lines according to claim 2, wherein the allocating connected components in the touching-region-segmented image to corresponding lines to generate a text line allocation result specifically comprises:

traversing all the connected components in the connected component set, and directly allocating a connected component passing through a local baseline to a text line where the local baseline is located;

allocating, according to position relationships between the connected components and the first local baseline in the local baseline information set, a connected component of the first text line;

allocating, according to position relationships between the connected components and the last local baseline in the local baseline information set, a connected component of the last text line; and allocating, according to distances from barycenter coordinates of the connected component to adjacent local baselines thereof, the connected component to an adjacent text line, to generate the text line allocation result.

4. The method for segmenting touching text lines according to claim 3, wherein the splitting text lines in the touching-region-segmented image according to the text line allocation result to generate a line-segmented image specifically comprises:

generating a text line image mask according to the text line allocation result;

performing an AND operation on connected components in each text line of the text line allocation result and the text line image mask, to generate a text line splitting result; and outputting the text line splitting result in the form of an image, to generate the line-segmented image.

5. A system for segmenting touching text lines in an image of a uchen-script Tibetan historical document, comprising:

a binary image obtaining module, configured to obtain a binary image of a uchen-script Tibetan historical document after layout analysis;

a local baseline detection module, configured to detect local baselines in the binary image, to generate a local baseline information set;

a touching-region detection and segmentation module, configured to detect and segment a touching region in the binary image according to the local baseline information set, to generate a touching-region-segmented image;

a module for allocation of connected components to corresponding lines, configured to allocate connected components in the touching-region-segmented image to corresponding lines, to generate a text line allocation result; and a text line splitting module, configured to split text lines in the touching-region-segmented image according to the text line allocation result, to generate a line-segmented image, wherein the local baseline detection module specifically comprises:

a horizontal projection unit, configured to project the binary image horizontally, and count a total quantity of foreground color pixels in each Y-axis position in X-axis direction, to generate a horizontal projection set;

a Hough line detection unit, configured to search for line segments in the binary image by using a Hough line detection method, to generate a line segment length set in each Y-axis position in X-axis direction:

a first-baseline-information-set determining unit, configured to determine, according to the horizontal projection set, a median of the horizontal projection set, the line segment length set, and a median of the line segment length set, baseline positions that possibly have baseline information, to generate a first baseline information set;

a connected component detection unit, configured to detect connected components in the binary image, to generate a connected component set in each Y-axis position in X-axis direction;

a bounding-rectangle-quantity counting unit, configured to count the quantity of upper edges of connected-component minimum bounding rectangles in each Y-axis position in X-axis direction according to the connected component set, to generate a bounding rectangle quantity set;

an average-character-height calculating unit, configured to calculate an average character height according to the connected component set;

a baseline position filtering unit, configured to filter the baseline positions in the first baseline information set according to the bounding rectangle quantity set and the average character height, to generate a second baseline information set;

a baseline position grouping unit, configured to group the baseline positions in the second baseline information set according to the average character height, to determine text line position information;

and a local baseline determining unit, configured to determine each local baseline according to the text line position information, to generate the local baseline information set.

6. The system for segmenting touching text lines according to claim 5, wherein the touching-region detection and segmentation module specifically comprises:

a touching region determining unit, configured to determine a touching region according to the connected component set and the local baseline information set;

a medial axis transformation unit, configured to perform medial axis transformation on the touching region, to generate a transformed touching region;

a touching point determining unit, configured to determine a touching point in the transformed touching region according to the local baseline information set and the average character height;

an unsmooth point detection unit, configured to detect unsmooth points in the touching region by using a Douglas-Peucker algorithm to obtain X-axis coordinates and Y-axis coordinates of the unsmooth points, and sequentially store the X-axis coordinates and Y-axis coordinates into a candidate splitting list;

an optimal-segmentation-point determining unit, configured to look for optimal segmentation points from the candidate splitting list according to the touching point;

a splitting line generating unit, configured to connect the optimal segmentation points to generate a splitting line; and a touching region segmenting unit, configured to segment the touching region by using the splitting line, to generate the touching-region-segmented image.

7. The system for segmenting touching text lines according to claim 6, wherein the module for allocation of connected components to corresponding lines specifically comprises:

a first unit for allocation of connected components to corresponding lines, configured to traverse all the connected components in the connected component set, and directly allocate a connected component passing through a local baseline to a text line where the local baseline is located;

a second unit for allocation of connected components to corresponding lines, configured to allocate, according to position relationships between the connected components and the first local baseline in the local baseline information set, a connected component of the first text line;

a third unit for allocation of connected components to corresponding lines, configured to allocate, according to position relationships between the connected components and the last local baseline in the local baseline information set, a connected component of the last text line; and a fourth unit for allocation of connected components to corresponding lines, configured to allocate, according to distances from barycenter coordinates of the connected component to adjacent local baselines thereof, the connected component to an adjacent text line, to generate the text line allocation result.

8. The system for segmenting touching text lines according to claim 7, wherein the text line splitting module specifically comprises:

a text-line-image-mask generating unit, configured to generate a text line image mask according to the text line allocation result;

an AND operation unit, configured to perform an AND operation on connected components in each text line of the text line allocation result and the text line image mask, to generate a text line splitting result; and a text-line-segmentation-result output unit, configured to output the text line splitting result in the form of an image, to generate the line-segmented image.

* * * * *